United States Patent
Shi et al.

(10) Patent No.: US 10,662,759 B2
(45) Date of Patent: May 26, 2020

(54) DATA LOGGER, MANUFACTURING METHOD THEREOF AND PRESSURE SENSOR THEREOF

(71) Applicant: Ningbo Wanyou Deepwater Energy Science & Technology Co., Ltd., Ningbo, Zhejiang (CN)

(72) Inventors: Zhaorui Shi, Ningbo (CN); Mengjiao Yu, Ningbo (CN)

(73) Assignee: Ningbo Wanyou Deepwater Energy Science & Technology Co., Ltd., Ningbo, Zhejiang (CN)

(*) Notice: Subject to any disclaimer, the term of this patent is extended or adjusted under 35 U.S.C. 154(b) by 143 days.

(21) Appl. No.: 15/595,908

(22) Filed: May 15, 2017

(65) Prior Publication Data
US 2017/0328196 A1    Nov. 16, 2017

Related U.S. Application Data

(60) Provisional application No. 62/335,712, filed on May 13, 2016.

(51) Int. Cl.
| | |
|---|---|
| *E21B 47/06* | (2012.01) |
| *E21B 21/08* | (2006.01) |
| *G01V 11/00* | (2006.01) |
| *E21B 47/01* | (2012.01) |

(52) U.S. Cl.
CPC .............. *E21B 47/06* (2013.01); *E21B 21/08* (2013.01); *E21B 47/01* (2013.01); *G01V 11/002* (2013.01)

(58) Field of Classification Search
CPC .......... E21B 21/08; E21B 47/01; E21B 47/06; G01V 11/002
USPC ............... 702/9; 73/7, 146.5, 431; 324/220; 340/572.1; 257/414; 166/255.1; 175/40
See application file for complete search history.

(56) References Cited

U.S. PATENT DOCUMENTS

| | | | |
|---|---|---|---|
| 6,241,028 B1* | 6/2001 | Bijleveld | E21B 23/00 175/40 |
| 6,324,904 B1* | 12/2001 | Ishikawa | E21B 47/011 257/E29.022 |
| 6,931,952 B2* | 8/2005 | Rantala | G01L 5/008 73/431 |
| 6,966,221 B2* | 11/2005 | Wilson | B60C 23/0408 73/146.5 |
| 10,001,007 B2* | 6/2018 | Pelletier | E21B 47/065 |
| 2007/0001249 A1* | 1/2007 | Chou | G06K 9/0002 257/414 |
| 2008/0157967 A1* | 7/2008 | Jones | G01G 15/00 340/572.1 |
| 2008/0204008 A1* | 8/2008 | Paulson | F16L 55/38 324/220 |
| 2010/0024518 A1* | 2/2010 | Radziszewski | B02C 17/1805 73/7 |
| 2011/0308796 A1* | 12/2011 | Hyland | E21B 17/028 166/255.1 |

* cited by examiner

*Primary Examiner* — John H Le
(74) *Attorney, Agent, or Firm* — Raymond Y. Chan; David and Raymond Patent Firm (57) ABSTRACT

A data logger comprises a mainboard and a jacketing, wherein the mainboard is covered with the jacketing, wherein the data logger is capable to be carried by said drilling fluid traveled in borehole, wherein the data in borehole is collected by the mainboard of the data logger during traveling.

18 Claims, 9 Drawing Sheets

DATA LOGGER, MANUFACTURING METHOD THEREOF AND PRESSURE SENSOR THEREOF

CROSS REFERENCE OF RELATED APPLICATION

This is a non-provisional application that claims the benefit of priority under 35 U.S.C. § 119 to a provisional application, application No. 62/335,712, filed May 13, 2016.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a data logger and manufacturing method thereof, and more particularly to a data logger using in measuring during drilling.

Description of Related Arts

For drilling operation, tough environment is the most difficulty and the most important factor to technology development. Because of harsh environment, like up to 15,000 psi and 250° C. or even higher, all downhole operation is with high temperature and high pressure. Also during drilling, drilling fluid and additives used causes corrosion resistance requirements. Therefore acquiring and monitoring environment data are critical, while detect the potential safety issues is crucial and necessary.

Figure 1:
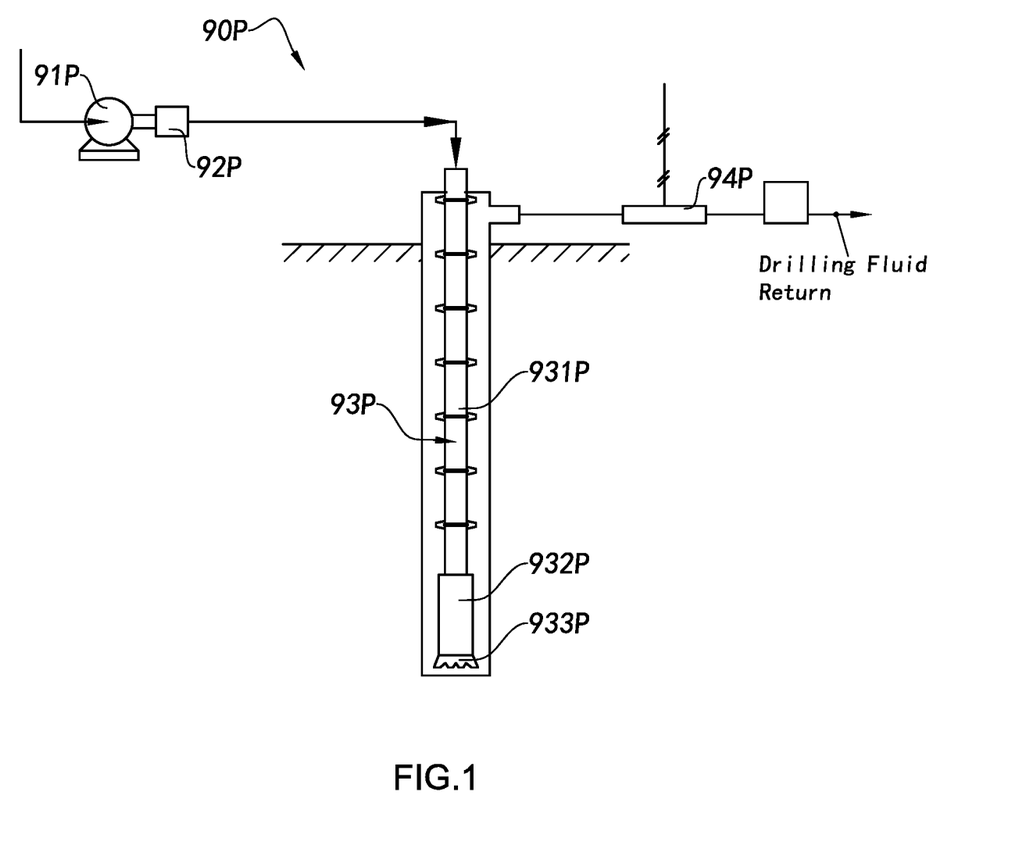
FIG. 1 is a schematic view of a traditional measurement-during-drilling (MWD) technology in a drilling system.

A drilling system 90P is illustrated in FIG. 1. The drilling system 90P comprises at least one mud pump 91P, a mud tank 92P stored with Drilling Fluid, and a drillstring 93P. The drilling fluid is driven by the mud pump 91P into the drillstring 93P while drilling borehole.

The drillstring 93P further comprises a drillpipe 931P, a drillcollar 932P and a drillbit 933P. The drilling fluid is introduced into the drillpipe 931P from the mud tank 92P by applying pressure from one or more mud pump 91P. Then the drilling fluid passes into the drillpipe 931P, the drillcollar 932P and reaches to the drillbit 933P in bottomhole. The drillbit 933P comprises at least one nozzle for the drilling fluid spring out of the drillstring 93P. One skilled in the art will understand that the drilling fluid circulates uphole in the annulus section and is then discharged into the mud tank 92P via a return flow line. So the cuttings generated by the drilling operation are carried by the drilling fluid from the bottomhole to the surface.

The drilling system 90P comprises a shale shaker 94P. Later back on the surface, the shale shaker 94P will separate comparatively large cuttings or other solids from the drilling fluid. Then, the drilling fluid is discharged into the mud tank 92P and is prepared to circulate again by applying the mud pump 91P.

After reaching to the surface, the drilling fluid with cuttings passes along the return flow line and then reaches to a shale shaker, where comparatively large cuttings or other solids can be separated from the drilling fluid.

The traditional measurement-during-drilling (MWD) technology is widely used for acquisition of data during drilling operation in a system as disclosed above. The information collected includes pressure, temperature, deviation directional surveys and so on.

Although the traditional system is useful, it does have its own limitations. Most of sensors of the MWD system are installed near the drillbit 933P. Therefore, only the information at the drillbit 933P can be measured. However, the parameters over the entire borehole, such as temperature or pressure profile, cannot be accessed by traditional MWD system. In addition, MWD system is typically expensive and requires much manpower and time to operate. Moreover, the transmission data rate is extremely low (less than 10 bit/s) because most MWD system still uses mechanical way, like mud pulse telemetry, to communicate between bottomhole and surface as the distance between bottom and surface reaches 12,000 ft and more.

In order to fit the drilling operation, measurement has to face harsh conditions. This leads to many problems. The encapsulated cover meets communication method. The efficient sensor meets battery problems. Nice data meets data acquisition problems, even in an acceptable data rate. And all design must consider the requirement of ultra-small size, which is adapted for the drilling system 90P avoiding huge cost of improvement As reasons mentioned, there is a need to provide a cost-effective device and system capable of measuring and storing downhole parameters, such as temperature and pressure over the entire borehole in real-time.

SUMMARY OF THE PRESENT INVENTION

The invention is advantageous in that it provides a data logger, wherein the data logger is adapted for measuring environmental data during drilling, so as to provide acquiring and monitoring borehole conditions by the data logger.

Another advantage of the invention is to provide a data logger, wherein the parameters over the entire borehole is received by the data logger, while the data logger carried by the drilling fluid.

Another advantage of the invention is to provide a data logger, wherein the data logger is adapted to drilling system which reduces cost greatly and the data logger is in ultra-small size to fit the drillstring of the drilling system.

Another advantage of the invention is to provide a data logger, wherein a measurement system further comprises an initiator, an injector, a recoverer, a data acquisitor, and a charger cooperated with the measurement of the data logger, so as the measurement system is capable to collect and record data over the whole borehole.

Another advantage of the invention is to provide a data logger, wherein the data logger is turned on by the initiator to be waked up before measuring and the data logger gets a start signal to record data.

Another advantage of the invention is to provide a data logger, wherein the data logger is injected into borehole by the injector to begin measuring and be carried by the drilling fluid, so as to ensure the data logger to be carried by the drilling fluid into the borehole.

Another advantage of the invention is to provide a data logger, wherein the acquisitor provides an acceptable data rate of the transmission data rate of the data logger to increase efficiency of measurement.

Another advantage of the invention is to provide a data logger, wherein the data logger is carried by the drilling fluid to travel over the drillstring and the borehole, so as to collect and record data which highly valuable to analysis environment during drilling.

Another advantage of the invention is to provide a data logger, wherein the measurement system is distributed collecting data to detect the potential safety issues and reduce costs of drilling.

Another advantage of the invention is to provide a data logger, wherein the measurement system is capable to provide temperature and pressure profile of the borehole.

Another advantage of the invention is to provide a data logger, wherein the data logger is made in ultra-small size, such as less than 7.5 mm, in order to pass through the nozzle of the drillbit and all of devices of the measurement system is suitable for micro size data interface.

Another advantage of the invention is to provide a data logger, wherein the data logger is capable to be exposed in the harsh environment in long time traveling of measurement.

Another advantage of the invention is to provide a data logger, wherein the data logger receives energy in plug charging or in wireless charging with non-contacting method to transmit energy to the data logger by the charger.

Another advantage of the invention is to provide a data logger, wherein the data logger comprises a sensor unit which further comprises a pressure sensor in ultra-small size with high measurement range and can be used in high pressure environments, so as the conditions of the borehole can be measured.

Another advantage of the invention is to provide a data logger, wherein the data logger is capable to suffer mechanical strength, thermal properties, and resistance to chemicals, so as to measure the environment of the borehole efficiently.

Another advantage of the invention is to provide a data logger, wherein the manufacturing of the data logger further considers the density of the data logger to enhance mobility so that data loggers can be carried efficiently by the drilling fluid through the entire wellbore.

Another advantage of the invention is to provide a data logger, wherein in consider of sensor efficiency, power supply, data storage and transmission, the data logger and the measurement system is well operational in actual drilling industry.

Additional advantages and features of the invention will become apparent from the description which follows, and may be realized by means of the instrumentalities and combinations particular point out in the appended claims.

According to the present invention, the foregoing and other objects and advantages are attained by a data logger, comprising:

a mainboard; and a jacketing, wherein the mainboard is covered with the jacketing, wherein the data logger is capable to be carried by said drilling fluid traveled in borehole, wherein the data in borehole is collected by the mainboard of the data logger during traveling.

According to the embodiments of the present invention, wherein the main board of the data logger further comprises a controller, a sensor unit, a power unit, a communication unit and a board body for supporting the controller, the sensor unit, the power unit and the communication unit together, wherein the sensor unit and the communication unit are controlled by the controller, wherein the controller, the sensor unit and the communication unit are supplied power by the power unit, wherein the sensor unit is capable to collect environment data which waited to be transmitted through the communication unit.

According to the embodiments of the present invention, wherein the controller, the sensor unit, the power unit and the communication unit are electrically connected to each other.

According to the embodiments of the present invention, wherein the main board of the data logger further comprises a storage unit, wherein the sensor unit is capable to collect environment data to be storage in the storage unit.

According to the embodiments of the present invention, wherein the main board of the data logger further comprises a switch, wherein the switch is turned on to wake up the controller, the sensor unit, the storage unit and the communication unit.

According to the embodiments of the present invention, wherein the switch is a photo detector.

According to the embodiments of the present invention, wherein the communication unit further comprises at least one connector connected the storage unit to be read from outside the data logger.

According to the embodiments of the present invention, wherein the communication unit is at least two pads connected to the surface of the data logger.

According to the embodiments of the present invention, wherein the storage unit is a flash memory.

According to the embodiments of the present invention, wherein the power unit further comprises a receiving unit and a rechargeable battery, wherein the receiving unit is received power to charge the rechargeable battery for the rechargeable battery provides power supply to the controller, the sensor unit, the storage unit, the switch and the communication unit.

According to the embodiments of the present invention, wherein the sensor unit further comprises a pressure sensor, wherein the pressure sensor collects pressure data of environment as the data logger travels in borehole.

According to the embodiments of the present invention, wherein the sensor unit further comprises a temperature sensor, wherein the temperature sensor collects temperature data of environment as the data logger travels in borehole.

According to the embodiments of the present invention, wherein the pressure sensor further comprises a pressure sensor chip and a bonding elements, wherein the bonding elements is electrical connected and fixed the pressure sensor chip with the board body.

According to the embodiments of the present invention, wherein the pressure sensor chip and the boding elements are packaged by a sealing layer which is covered a non-sensing area of the pressure sensor chip to expose a sensing area of the pressure sensor chip.

According to the embodiments of the present invention, wherein the pressure sensor further has a sensing channel formed by the sealing layer to make the sensing area of the pressure sensor chip efficient to sense the pressure and collect data of pressure.

According to the embodiments of the present invention, wherein the sensing channel is formed integrated by the sealing layer.

According to the embodiments of the present invention, wherein the jacketing is compound by sealing materials and density control materials.

According to the embodiments of the present invention, wherein the data logger further comprise a shell outside the jacketing to enhance the resistance to chemicals.

According to the embodiments of the present invention, wherein the data logger has diameter less than 7.5 mm.

In accordance with another aspect of the invention, the present invention comprises a real-time measurement system with at least one data logger as recited above, comprising:

an initiator for turning on the data logger;
an injector to inject the data logger into borehole;
a recoverer to get the data logger back from borehole;
a data acquisitor to transmit data from the data logger for analyzing; and
a charger for supplying power to the data logger.

According to the embodiments of the present invention, wherein the data logger is carried to collect environment data continually to measure situation of borehole.

According to the embodiments of the present invention, wherein the data logger is turned on by the initiator and waked all sensors to collect data.

According to the embodiments of the present invention, wherein the initiator provides a switch signal to the data logger to start the measurement.

According to the embodiments of the present invention, wherein the switch signal is selectable from optical signal, electrical signal or magnetic signal.

According to the embodiments of the present invention, wherein the injector provides an injecting power to place the data logger in borehole.

According to the embodiments of the present invention, wherein the data logger 10 later be recovered by the recoverer out of the drilling fluid.

According to the embodiments of the present invention, wherein the data of the data logger is acquired by the acquisitor to be further analyzed.

According to the embodiments of the present invention, wherein the data acquisitor further comprises at least one seat for placing the data logger, a transmitting connector set inside the seat and an acquisition board to acquire data recorded in the data logger through the transmitting connector and the connectors of the communication unit of the data logger.

In accordance with another aspect of the invention, the present invention comprises a measurement method of the measurement system as recited above, comprises following steps:

initiating the data logger to prepare to collect data;
injecting the data logger into borehole;
collecting data by the data logger which carried by drilling fluid;
recovering the data logger from the drilling fluid; and
downloading data from the data logger.

According to the embodiments of the present invention, wherein before injecting the method further comprises following steps:

charging the data logger.

According to the embodiments of the present invention, wherein after collecting data, the method further comprises following steps:

charging the data logger.

According to the embodiments of the present invention, wherein the step of initiating the data logger further comprises receiving a switch signal to initiating the data logger.

According to the embodiments of the present invention, wherein the step of injecting the data logger further comprises forced by an injecting power to the data logger.

In accordance with another aspect of the invention, the present invention comprises a method of manufacturing the data logger as recited above, comprises following steps:

assembly the main board of the data logger;
placing the main board in a mould;
pouring the material of the jacketing between the main board and the mould;
solidifying the jacketing and demoulding;
placing the mould on the other side of the main board;
pouring the material of the jacketing between the main board and the mould; and
solidifying the jacketing and demoulding to be the data logger.

According to the embodiments of the present invention, wherein the mould is shaped in cup-shape.

According to the embodiments of the present invention, wherein during pouring the material of the jacketing further comprises putting density control materials inside.

According to the embodiments of the present invention, wherein the density control materials is selected from low density epoxy foam, aerogel and glass microsphere.

According to the embodiments of the present invention, wherein after the step of solidifying the jacketing and demoulding to be the data logger, the method further comprises following steps:

placing the main board in the mould;
pouring the material of the shell between the main board and the mould; and
solidifying the shell and demoulding.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

One skilled in the art will understand the technical term used in the present invention, such as drilling, drillstring, shale shaker, drillpipe, drillcollar, drillbit, drilling fluid and so on, are sample of application situation of the preferred embodiments of the present invention.

Figure 2:
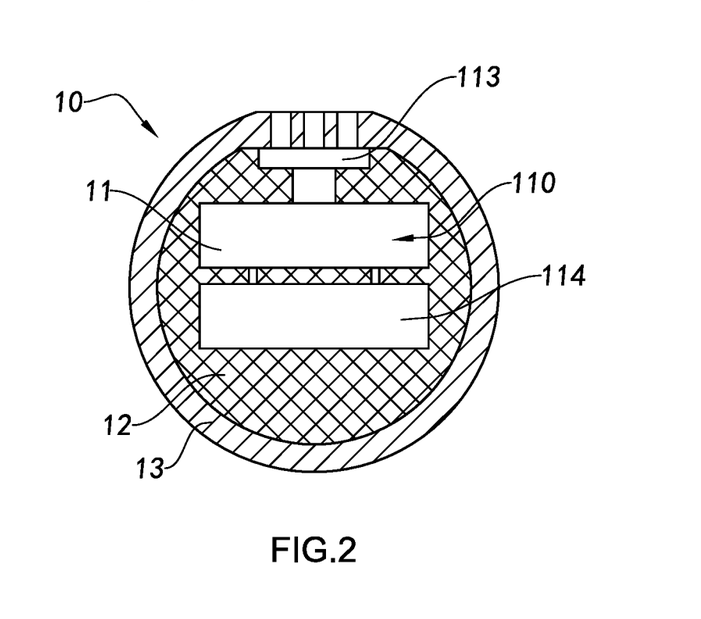
FIG. 2 is a perspective view of a data logger of a real-time measurement system according to a preferred embodiment of the present invention.

A data logger 10 is provided in a preferred embodiment of the present invention, as shown in FIG. 2. The data logger 10 is a kind of small SoC (System-on-Chip) system for understanding, which can sensor parameters of the surrounding environment, record data, transmit data and supply power for its working. As the surrounding environment is not common, the data logger 10 has to face to extremely harsh conditions in the universe, for example in the borehole of drilling or the bottom of abysmal sea. As the data collected by the data logger 10 is priceless, the importance of the data logger 10 is incomparable to traditional loggers and the measure system of the data logger 10 has to be fully considered around the data logger 10.

The data logger 10 comprises a mainboard 11 and a jacketing 12, wherein the mainboard 11 is covered with the jacketing 12 to packaging the mainboard 11 to protect the mainboard 11. The jacketing 12 is made of chemical materials that is corrosion resistant, so as to encapsulate the mainboard 11 in a protective coating to be functional during operating. It is worth to mention that the jacketing 12 is compound by sealing materials and density control materials to avoid the data logger 10 to be effected by gravity since the mainboard 11 is almost made of electrical metal. Therefore, the data logger 10 is preferably adapted to drilling operation, which can be carried by the drilling fluid traveled the whole borehole and recycled by the drilling system.

Figure 3:
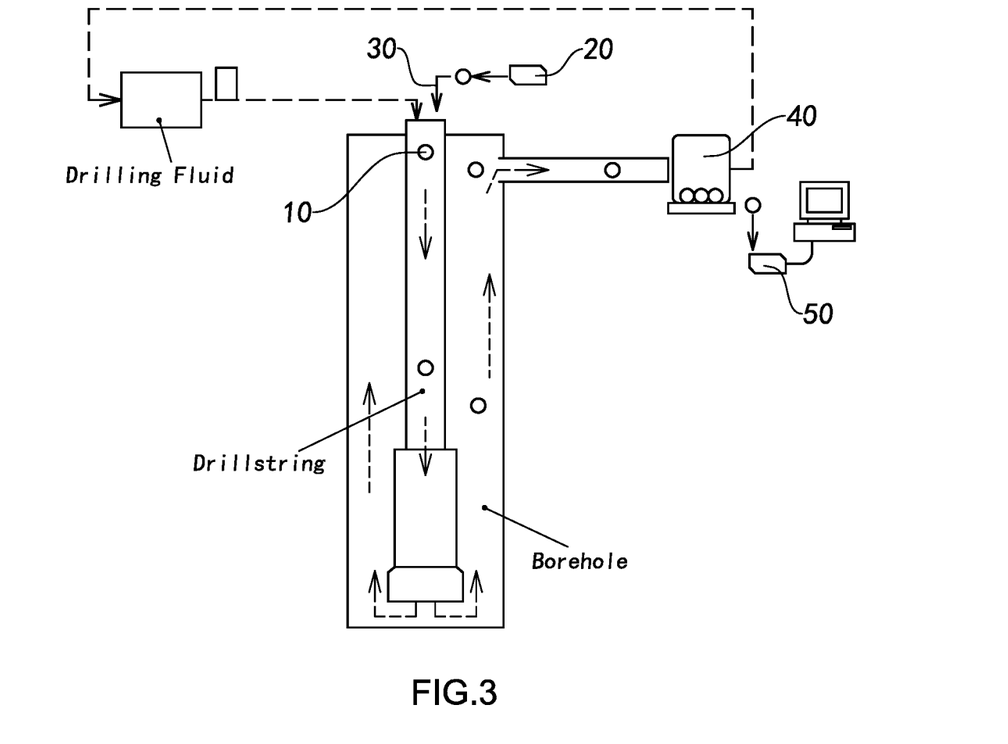
FIG. 3 is a schematic view of the real-time measurement system according to the above preferred embodiment of the present invention.

A real-time measurement system 100, as shown in FIG. 3, comprises at least one data logger 10, an initiator 20 for turning on the data logger 10, an injector 30 to inject the data logger 10 into borehole, a recoverer 40 to get the data logger 10 back from borehole, a data acquisitor 50 to transmit data from the data logger for analyzing, and a charger 60 for supplying power to the data logger 10. Since the drilling fluid traveling the whole borehole drove by the drilling system, the data logger 10 can be carried to collect environment data continually to measure situation of borehole in real-time. It is worth to mention that the real-time measurement system 100 needn't be set in advance to the drilling system to reduce lots of cost.

As the density of the data logger 10 is to be controlled near to the drilling fluid, the data logger 10 can be carried by the drilling fluid to travel the whole borehole and be recycled to download data that collected in the borehole. The data logger 10 can collect several kinds of parameters during traveling, including pressure, temperature, acceleration, γ-ray and so on and be to profile according to the time from initiation to acquisition which lasts up to 2 hours about 15,000 ft well.

In operation, it is preferably that several the data loggers 10 are inject in borehole and carried by the drilling fluid. It is worth to mention that each of the data logger 10 is individual which is hardly to affect others. It measures temperature, pressure and other parameters continuously after it is initiated by the initiator 20. The initiator 20 is preferably to be an optical signal transmitter. The initiator provides an optical signal to the data logger. This signal may be a visible light, or an invisible light including infrared light and ultraviolet light. The switch 121 in the data logger 10 receives the optical signal and wake up the data logger 10 from deep sleep mode. After the initiation, the data logger 10 is able to start measurement at adjustable sampling rate, for example, 1 second per sample or 2 seconds per sample. The sampling rate of the data logger 10 can be modified by programming. Each sampling cycle in different sampling rate, for example, in 1 second per sample, only 1/100 seconds is taken by the data logger 10 to complete the measurement and store the data. Data logger 10 is in power saving mode in other 99/100 seconds. The strategy of power management can help the data logger 10 work long enough with a limitation of the battery capacity.

When multiple the data loggers 10 are initiated by the optical signal sent from the initiator 20, they are all deployed into the top of drillpipe when making pipe connection. In one embodiment, the data loggers 10 are incorporated into a certain amount of high viscosity fluid to be injected into the drilling fluid. The data loggers 10 are circulated together with the drilling fluid inside the drillstring. Then they reach to the drillbit and pass through the nozzles. In operation, a short distance, for example, 10 ft should be kept between the nozzles and the bottomhole. This can reduce the impact force when the data loggers 10 hit on the bottom wall the well since the jet velocity from the nozzles is very high. The data loggers are circulated upward in the annulus section and reach to the shale shaker. The data loggers 10 and cuttings generated downhole during drilling operation are separated from the drilling fluid on the shale shaker. A group of magnetic strips are placed on the shale shaker, so the metal part inside the data loggers 10 can be attracted by the magnetic strips. All the survived data loggers 10 are retrieved on the magnetic strips. During the trip with the drilling fluid in the borehole, the data loggers always take measurement and store the measurement data continuously. The data loggers 10 are then connected to the data acquisitor 50 for the data downloading process.

Figure 4:
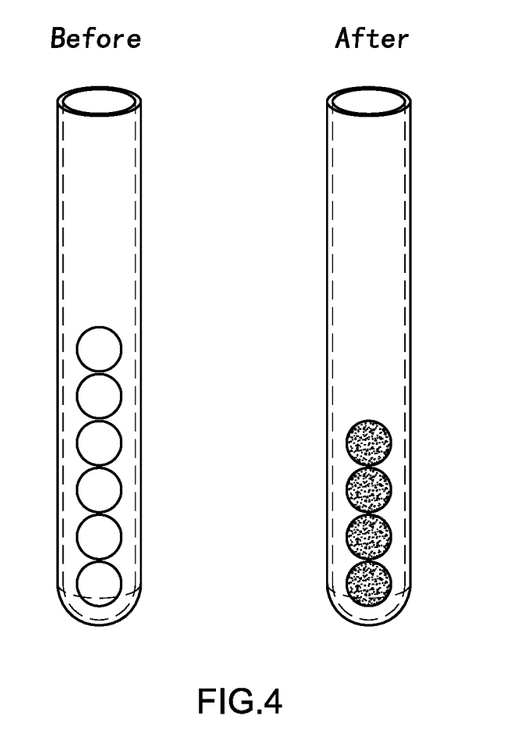
FIG. 4 is a real product picture of the data logger before measurement and after measurement according to the above preferred embodiment of the present invention.

The data logger 10 further comprise a shell 13 outside the jacketing 12 to enhance the resistance to chemicals. The shell 13 is optional since the jacketing 12 is well sealed the main board. It is worth to mention that the shape of the data logger 10 is selectable from ball, ellipsoid, hemisphere and so on which can be decide by the shell 13 or the jacketing 12. FIG. 4 is a picture of the data logger before measurement and after measurement according to the preferred embodiment of the present invention. The shape won't be changed because of the shell 13 or the jacketing 12.

Figure 5:
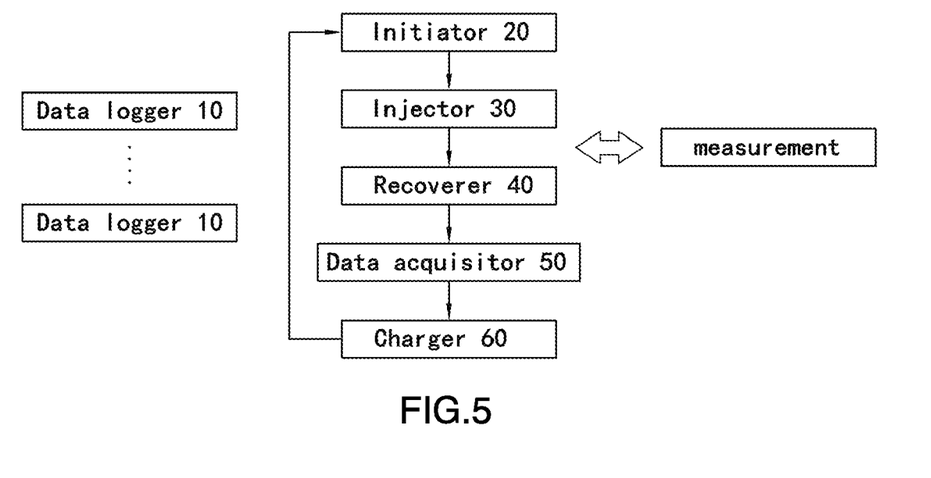
FIG. 5 is a flow chart of the real-time measurement system according to the above preferred embodiment of the present invention.

A flow chart of the measurement system 100 is illustrated in FIG. 5. The data logger 10 is turned on by the initiator 20 and waked all sensors to collect data. The initiator 20 provides switch signal 200 to the data logger 10, for example optical signal, electrical signal or magnetic signal, to start the measurement of borehole. Then the data logger 10 can be injected in borehole by the injector 30 which provides injecting power 300 to place the data logger 10 in the drilling fluid. The data logger 10 later be recovered by the recoverer 40 out of the drilling fluid. Finally, the data of the data logger 10 is acquired by the acquisitor 50 to be further analyzed. What is more, the data logger 10 can be charged by the charger 60 as needed when back from borehole. And if the data logger 10 out of power during in borehole, the measurement will be pause but the data logger 10 still can be carried back by the drilling fluid and be recycled to be charged.

As disclosed above, the method of measurement of the measurement system 100 comprises following steps:

Initiating the data logger 10 to prepare to collect data;
Injecting the data logger 10 into borehole;
Collecting data by the data logger 10 which carried by drilling fluid;
Recovering the data logger 10 from the drilling fluid; and
Downloading data from the data logger 10.

Further, before injecting or after collecting data, the method further comprises following steps:

Charging the data logger 10.

The step of initiating the data logger 10 further comprises receiving a switch signal 200 to initiating the data logger 10.

The step of injecting the data logger 10 can be manual or mechanical, which the data logger 10 is forced by an injecting power 300.

In an alternative mode of the preferred embodiment, the step of downloading data and charging can be synchronous.

After downloading the data, the data logger 10 can be reused for next measurement.

Figure 6:
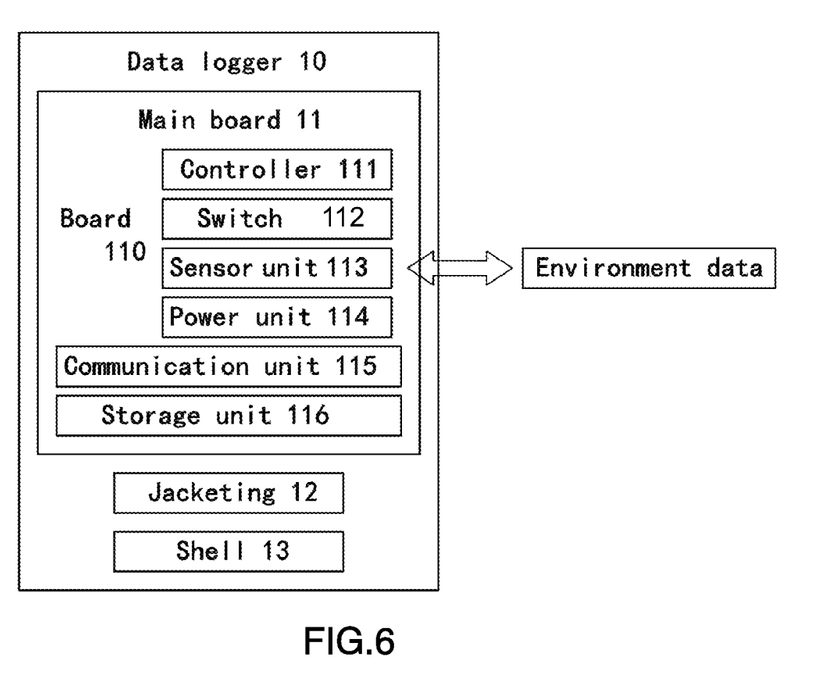
FIG. 6 is a block diagram of the data logger according to the above preferred embodiment of the present invention.
Figure 7:
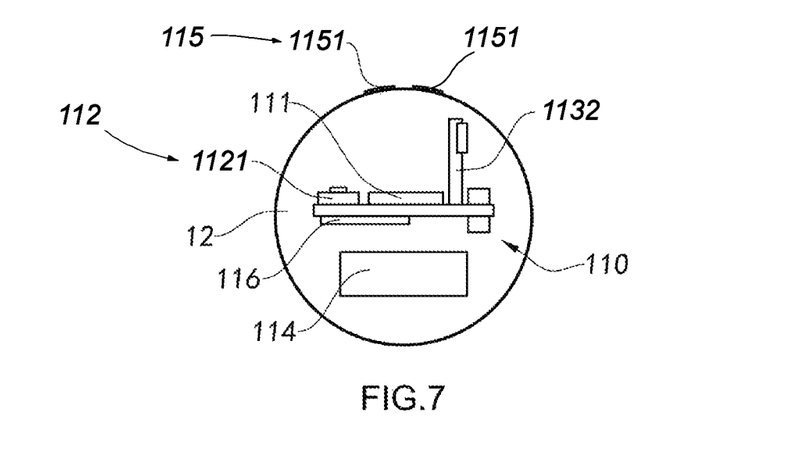
FIG. 7 is a perspective view of the main board of the data logger of a real-time measurement system according to the above preferred embodiment of the present invention.
Figure 8:
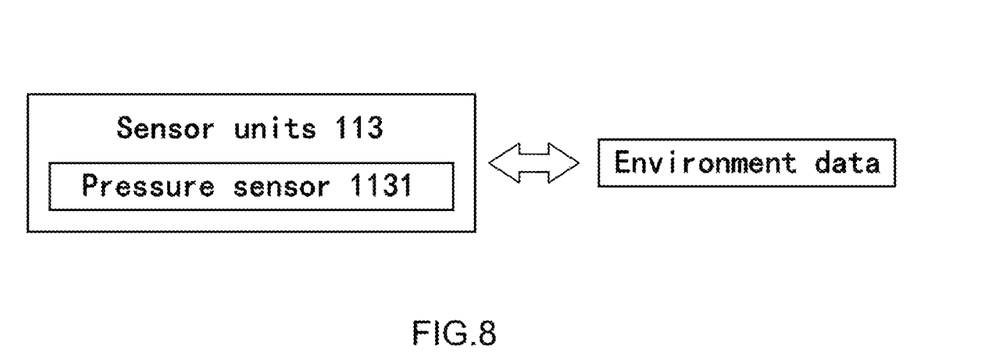
FIG. 8 is a block diagram of the sensor unit of the data logger according to the above preferred embodiment of the present invention.

Furthermore, as shown in FIG. 6 to FIG. 8, the main board 11 of the data logger 10 further comprises a controller 111, a switch 112, a sensor unit 113, a power unit 114, a communication unit 115, a storage unit 116, and a board body 110 for supporting the controller 111, the switch 112, the sensor unit 113, the power unit 114, the communication unit 115 and the storage unit 116 together. The switch 112 is preferably to be a photo detector 1121 in the preferred embodiment. The communication unit 115 further comprises at least one connector 1151 connected the storage unit 116 to be read from outside the data logger 10. The storage unit 116 is preferably to be a flash memory 1161 in the preferred embodiment. One skilled in the art will understand that the controller 111, the switch 112, the sensor unit 113, the power unit 114, the communication unit 115 and the storage unit 116 are electrically connected to each other. And the sensor unit 113 is capable to collect environment data to be storage in the storage unit 116 waiting to be transmitted through the communication unit 115 later back to the data acquisitor 50. The power unit 114 provides power to the controller 111, the switch 112, the sensor unit 113, the communication unit 115 and the storage unit 116 for working.

As illustrated in FIG. 8, the sensor unit 113 further comprises a pressure sensor 1131, wherein the pressure sensor 1131 collects data of environment wherein the data logger 10 travels in the borehole.

FIG. 7 shows an alternative mode of the preferred embodiment of a data logger 10 with the temperature sensor 1132 used in the system. The main board 11 of the data logger 10 comprises the controller 111 with an internal flash memory, a photo detector 1121, a light-emitting diode (LED) and a temperature sensor 1132 and other relative components such as resistors and capacitors. An external flash memory 1161 may be added when higher data capacity is needed. The main board 11 has to be designed in an ultra-small size, low cost and low power consumption, for example, a round microchip has 5 mm in diameter. The power unit 114 is preferably selected for a small size and a large capacity. It may be a lithium rechargeable battery. A small size power unit 114 may be an inductive coil, which uses an electromagnetic field to obtain energy from the external inductive coil in a charging base station. All the components are encapsulated in a protective shell and comprise a spherical shape. The jacketing 12 may be a transparent, high mechanical strength, high glass transition temperature resin, epoxy or conformal coating. So it is able to protect the components on the mainboard 11 away from the harsh high temperature high pressure downhole conditions. Also, the density of the jacketing 12 should be close to the drilling fluid density so data loggers 10 are able to move with drilling fluid. The communication unit 115 which preferred to be two pads 1151 as the connectors 1151, connected to the interface of the mainboard 11 is placed on the surface of the jacketing 12 of the data logger 10. During data downloading process, the two pads 1151 are used to connect to the data acquisitor 50 to establish a communication between data logger 10 and the data acquisitor 50.

The controller 111 provides system control, data conversion and management of the data logger 10. It is preferably selected for ultra-small size, low power microcontroller in the market. The storage unit 116 may be an individual external memory chip to store the measurement data and other information including ID of the data logger. A photo detector 1121 detects the optical signal 200 sent from the initiator 20 and then enables the microcontroller to enter the work mode. The LED controlled by the controller 111, is used to inform the operator the status of the data logger 10. For example, when the data logger 10 is under charging, the LED stays on; when the data logger 10 is initiated, the LED turns off; when the data logger is sampling, the LED starts blinking; when the battery runs down, the LED turns off again.

The temperature sensor 1132 is an ultra-small size, low power and high precision component. The temperature sensor 1132 may be a digital output type, which has a microcontroller compatible interface for data management; or an analog output type, which need an analog-to-digital converter (ADC) inside the controller 111 to convert the output to the digital data so it can be stored into the storage unit 116.

Figure 9:
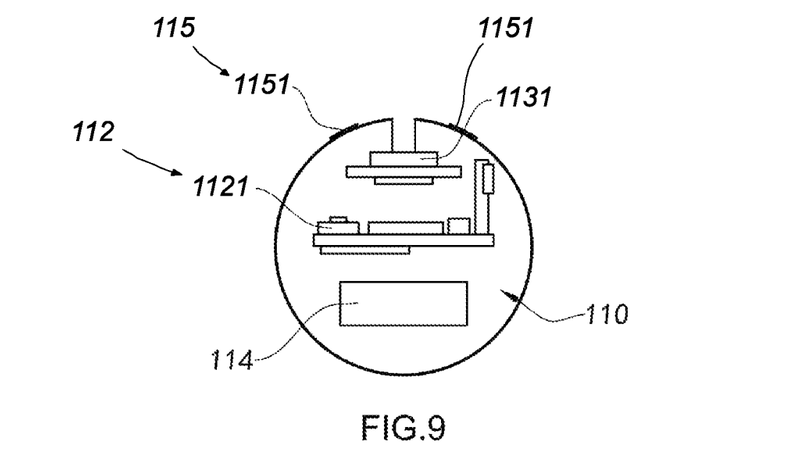
FIG. 9 is a perspective view of an alternative mode of the main board of the data logger of a real-time measurement system according to the above preferred embodiment of the present invention.

FIG. 9 shows an alternative mode of the preferred embodiment of a data logger 10 used in the system 100. The pressure sensor 1131 comprises a pressure sensor chip 11311. The pressure sensor chip 11311 may be in a small size that can measure pressure in fluid, clean air or non-corrosive gas environment. Connection wires may be used between the mainboard 11 and the pressure sensor 1131. A small size (1 mm diameter) hole needs to be drilled on top of the pressure sensor 1311 to make a contact area between the pressure sensor 1131 and drilling fluid when the data logger 10 is circulating downhole.

Downhole pressure measurement may vary from a few thousands psi to tens of thousands psi. Normally the accuracy of the ADC in the controller 111 is not high enough for the downhole pressure measurement. Therefore, in order to have a precise pressure measurement, an external high precision ADC may be used to convert the pressure measurement. This ADC may have low power consumption, high resolution with a compatible interface to the microcontroller.

Figure 10:
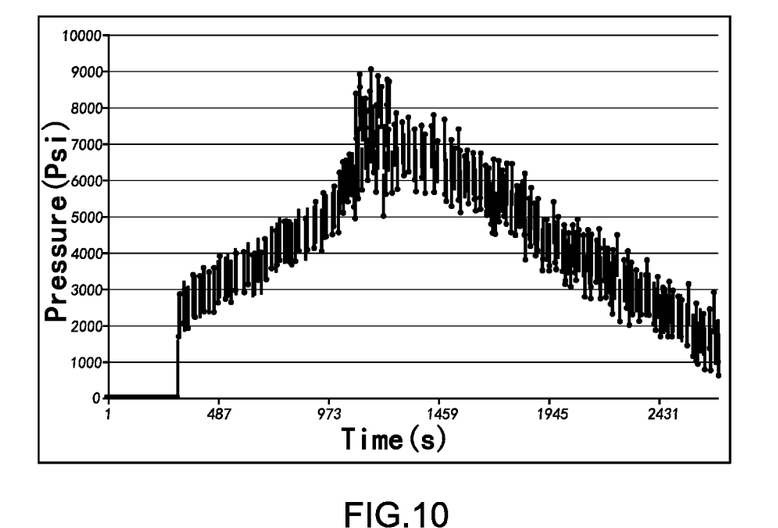
FIG. 10 is an example temperature profile of the data logger of a real-time measurement system according to the above preferred embodiment of the present invention.

As some kinds of the sensor has requirement of reach the outside of the data logger 10 to feel the condition of the environment. One skilled in the art will understand that it risks to expose the main board 11 to the harsh environment. Therefore the sensors preferred to be die in module. The pressure sensor 1131 of the sensor unit 113 is made packaged and ensured valid. And the data will be acquired by the acquisitor 50 to be profile like FIG. 10

Figure 11:
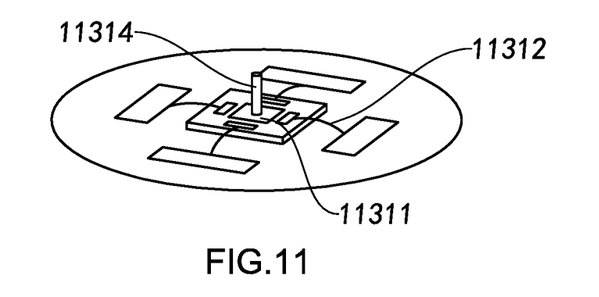
FIG. 11 is a schematic view of the pressure sensor of the data logger according to the above preferred embodiment of the present invention.
Figure 12:
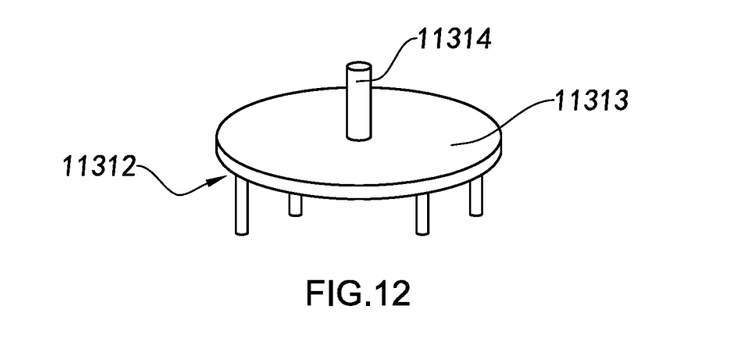
FIG. 12 is a schematic view of the pressure sensor of the data logger according to the above preferred embodiment of the present invention.

It is worth to mention that the pressure sensor 1131 further comprises a pressure sensor chip 11311 and a bonding element 11312, wherein the bonding element 11312 is electrical connected and fixed the pressure sensor chip 11311 with the board body. The connection of the pressure sensor chip 11311 and the pressure sensor chip 11311 is shown in FIG. 11 and FIG. 12. The pressure sensor chip 11311 is capable to sense the pressure of the environment and preferably is piezoelectric which transduces pressure into electric signal received by the storage unit 116 to collect the pressure in borehole. The pressure sensor chip 11311 and the boding elements 11312 further are packaged by a sealing layer 11313 which is covered a non-sensing area 113112 of the pressure sensor chip 11311 so as to expose a sensing area 113111 of the pressure sensor chip 11311. It is worth to mention that there is further a sensing channel 11314 formed by the sealing layer 11313 to make the sensing area 113111 efficient to sense the pressure and collect data of pressure.

In the preferred embodiment, the boding elements 11312 is directly connected and fixed the pressure sensor chip 11311 to the main body 110. Preferably, the bonding elements 11312 are chosen to be bonding wires which is connected electrically and physically.

In an alternative embodiment the bonding elements 11312 further comprises a sensor board to accept the pressure sensor chip 11311 out of the main board 11, at least one transfer pads to connected the pressure sensor chip 11311 to the sensor board, and at least one transfer pins to connected the transfer pads 113121 to the main board 11. Also the bonding element 11312 is sealed in the sealing layer 11313 partly.

Figure 13:
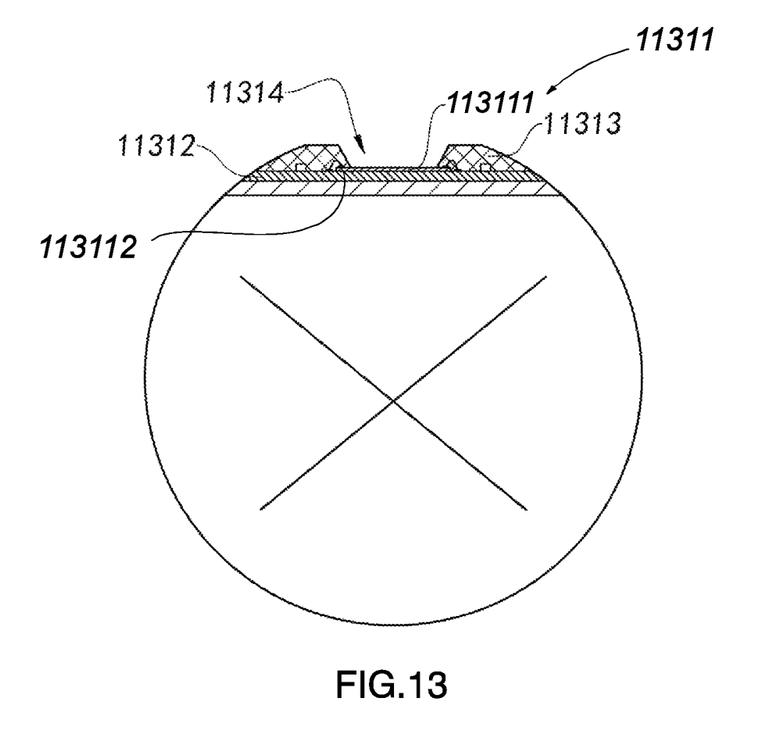
FIG. 13 is a schematic view of the pressure sensor of the data logger according to the above preferred embodiment of the present invention.
Figure 14:
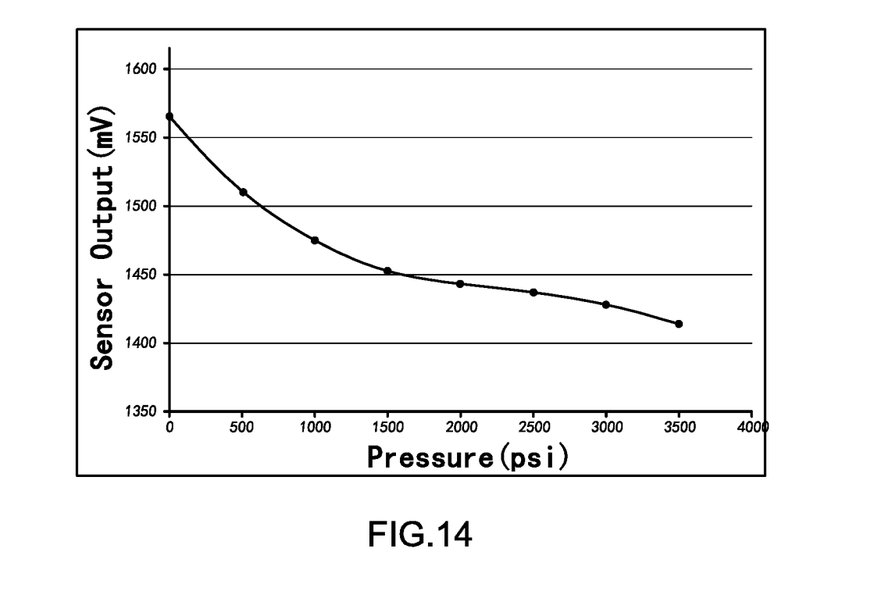
FIG. 14 is a performance profile of the pressure sensor of the data logger according to the above preferred embodiment of the present invention.
Figure 15:
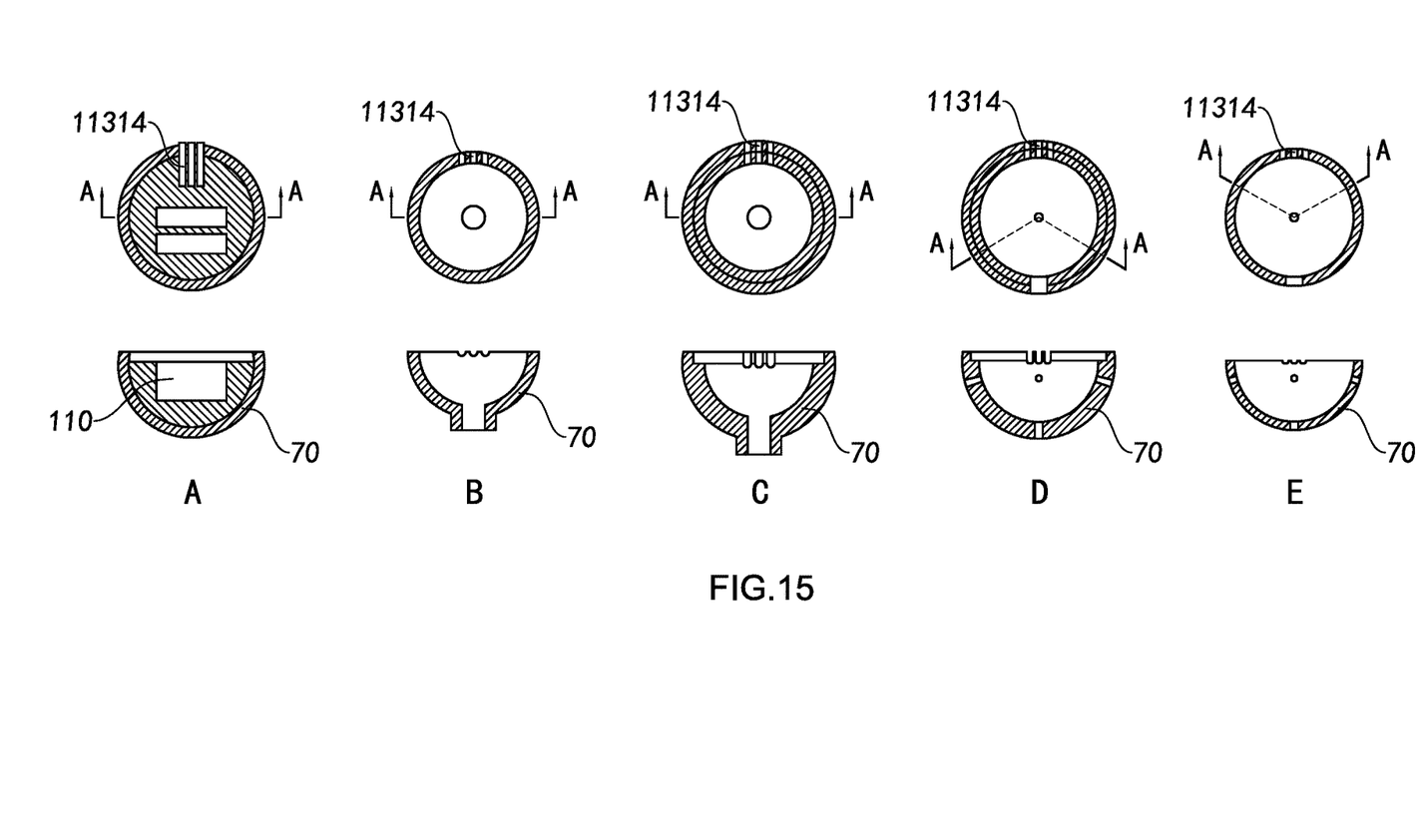
FIG. 15 is a schematic view of the molds for manufacturing the data logger according to the above preferred embodiment of the present invention.

It is worth to mention that the sensing channel 11314 is formed by a tube as in FIG. 11 and FIG. 12. In another mode, as in FIG. 13, the sensing channel 11314 can be formed integrated by the sealing layer 11313 while molding so that the sensing channel 11314 is formed by the sealing layer 11313 to make the sensing area 113111 efficient to sense the pressure and collect data of pressure. And there is a performance profile of the pressure sensor 1131 of the data logger 10 according to the preferred embodiment of the present invention.

FIG. 12 shows an outside view of the pressure sensor 1131 according to the embodiment of the invention. Referring to FIG. 12, the pressure sensor 1131 comprises the sealing layer 11313, which may be completely surrounded by an encapsulated compound, is used to provide protection for the main sensing module inside. A small diameter open hole is located on top of the sealing layer 11313. A same diameter sensing channel 11314 is connected to the sealing layer 11313, so gas or fluid from the measurement medium can pass through the sensing channel 11314 to main sensing module inside. At the bottom of the sealing layer 11313, multiple transfer pins 113123 are mounted. The transfer pins 113123 are connected to the terminals of the pressure sensor including power supply, ground and analog or digital outputs of the main sensing module inside the sealing layer 11313. The other end of the transfer pins 113123 can be electrically connected by conductive adhesive, soldering or plugging to other control circuit module or devices for different applications.

In some other embodiments, the shape of the housing and pressure introducing channel can be other shapes, such as cubic or hexagonal. Also, small size tubes such as a needle tubing can be used as a pressure introducing channel.

FIG. 22 shows the embodiment of the pressure sensor 1131 inside the sensor sealing layer 11313 according to the present invention. Pressure sensor chip, or pressure sensor die 11311 is bonded on the sensor board 113122. The pressure sensor chip 11311 is connected by bonding wires to on the sensor board 113122. All the transfer pads 113131 and pressure sensor chip 11311 are encapsulated by a protective coating or compound. The sensing channel 11314 is mounted or bonded on the sensing area 113111 of the pressure sensor chip 11311. So a contact area is created between the sensing area 113111 of the pressure sensor chip 11311 and the outside measurement medium. In some cases, other electronic components such as capacitors and resistors are used in the module. These components can be soldered on the bottom side of the sensor board 113122.

The output of the pressure sensor module is typically analog or digital. In some embodiments, an analog to digital converter (ADC) can be embedded in the module if an analog output is used. This ADC may have a low power consumption, high resolution and ultra-small size for the micro size pressure sensor module.

The preferred embodiment of the present invention further provides a method of manufacturing the data logger 10 and a mould 70 for packaging the data logger 10, as shown in FIG. 15 to FIG. 19. The mould 70 is shaped in cap which suitable for placing the main board 11 inside.

Figure 16:
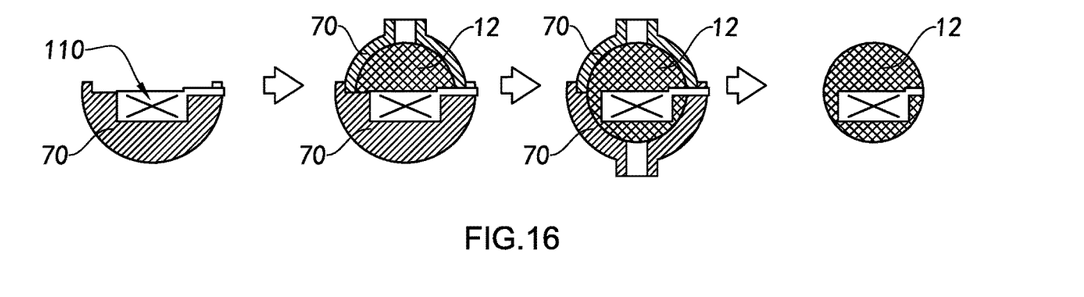
FIG. 16 is a flow chart of manufacturing the data logger according to the above preferred embodiment of the present invention.
Figure 17:
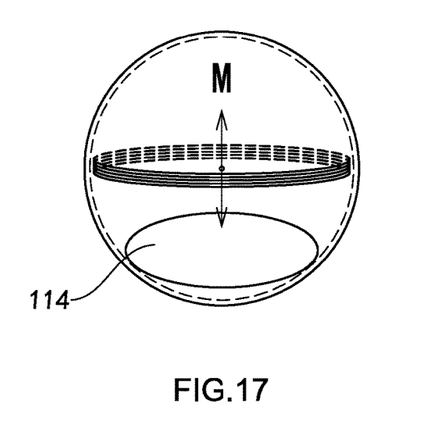
FIG. 17 is a schematic view of the density control during manufacturing the data logger according to the above preferred embodiment of the present invention.
Figure 18:
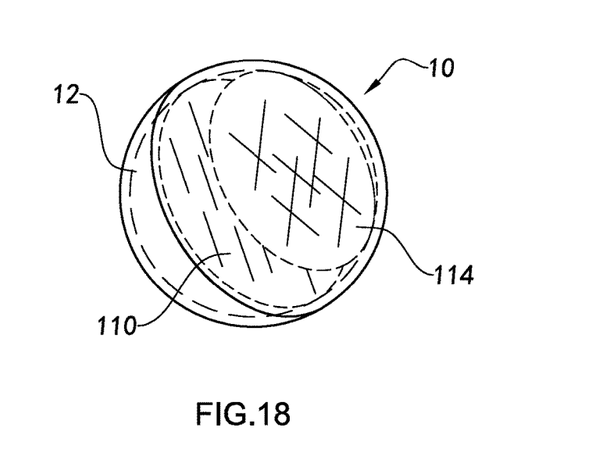
FIG. 18 is a real product picture of the data logger according to the above preferred embodiment of the present invention.

The method of manufacturing the data logger 10 comprises following steps:

Assembly the main board 11 of the data logger 10;

Placing the main board 11 in the mould 70;

Pouring the material of the jacketing 12 between the main board 11 and the mould 70;

Solidifying the jacketing 12 and demoulding;

Placing the mould 70 on the other side of the main board 11;

Pouring the material of the jacketing 12 between the main board 11 and the mould 70; and Solidifying the jacketing 12 and demoulding to be the data logger 10.

The material of the jacketing 12 is preferably to be thermosetting adhesive, optical setting adhesive and so on. One of the material of the jacketing 12 is polymer epoxy resin which can be solid in common temperature.

Further, during pouring the material of the jacketing 12 further put density control materials inside, such as low density epoxy foam, aerogel, glass microsphere and so on, which is about 0.4-0.8 g/cc. Therefore the density of the data logger 10 is adjustable to be near to the density of the drilling fluid and the center of gravity is steady. As in FIG. 17, direction M is the opposite of the gravity that the suffered.

The method of manufacturing the by the shell 13, after the step of solidifying the jacketing 12 and demoulding to be the data logger 10, further comprises following steps:

Placing the main board 11 in the mould 70;

Pouring the material of the shell 13 between the main board 11 and the mould 70; and Solidifying the shell 13 and demoulding.

Figure 19:
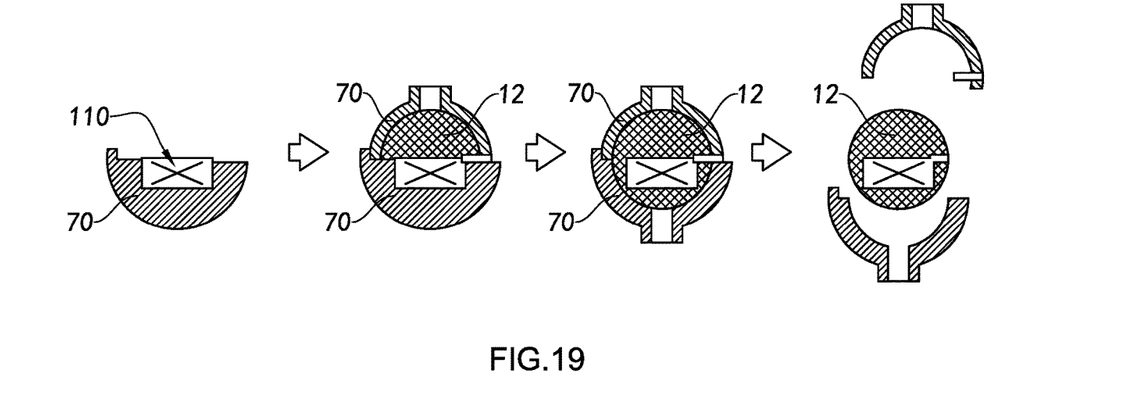
FIG. 19 is a flow chart of an alternative mode of manufacturing the data logger according to the above preferred embodiment of the present invention.

Furthermore, as the sensor unit 113 needed to be touched to the environment, like the sensing channel 11314 of the pressure sensor, it is worth to mention that the shape of the mould 70 needs to be matched to the sensing channel 11314. As shown in FIG. 19, the method of manufacturing the data logger 10 is illustrated. The tube which formed the sensing channel 11314 is placed at the sensing area 113111 of the pressure sensor chip 11311 advanced. While pouring the material of the jacketing 12 between the main board 11 and the mould 70, the sensing channel 11314 can be formed integrated by the jacketing 12. And it is worth to mention that the tube can be demould or can be leave inside the as long as the sensing area 113111 is ensured. Also, the sensing channel 11314 can be formed by the sealing layer 11313 and then enhance by the jacketing 12. And the sensing channel 11314 can be formed only by the sealing layer 11313 which also works to keep the sensing area 113111 functional. In FIG. 19, the method of the manufacturing of the sensing channel 11314 is disclosed which teaches other kinds of sensor to form channels for sensing the environment as required.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A drill measuring system for a drilling system, comprising a charger, and a drillbit having a nozzle and a drilling fluid releasing out of the drillbit through the nozzle, to drill a borehole, comprising:

an initiator;

a recover;

a data logger having a size smaller than a size of the nozzle and being wirelessly activated and switched on by said initiator for being carried by the drilling fluid to travel in the borehole, wherein said data logger comprises a jacketing and a main board covered in said jacketing, wherein said main board comprises a controller, a sensor unit connected to said controller for collecting environment data of the borehole when said data logger travels at the borehole, and a communication unit receiving said environment data, wherein said sensor unit comprises a sensor chip having a sensing area and a non-sensing area, and a sealing layer sealed at said non-sensing area of said sensor chip to expose said sensing area thereof, such that said non-sensing area of said sensor chip is covered by said sealing layer while said sensing area of said sensor chip is uncovered by said sealing layer, wherein said data logger downwardly travels top to bottom for reaching the drill along the drilling fluid and passing through the nozzle out of the drillbit, wherein said data logger is then circulated upwardly and returned to said recover out of the drilling fluid, such that said recover removes said data logger from the borehole, wherein said data logger is reusable for next measurement, wherein the size of said data logger is smaller than 7.5 mm, wherein said data logger further comprises a power unit that powers said controller and said sensor unit, wherein said power unit is rechargeable via the charger when said data logger is returned back to said recover; and a data acquisitor communicating with said communication unit, wherein said environment data is transmitted from said communication unit to said data acquisitor.

2. The drill measuring system, as recited in claim 1, wherein said data logger further comprises a storage unit linked to said sensor unit to store said environment data.

3. The drill measuring system, as recited in claim 2, wherein said data logger further comprises a photo detector serving as a switch that detects optical signal sent from said initiator to activate and switch on said data logger, wherein said initiator comprises an optical signal transmitter transmitting said optical signal as a switch signal to said data logger.

4. The drill measuring system, as recited in claim 3, wherein said communication unit comprises two pads disposed at and overlapped on a surface of said jacketing and connected to said data acquisitor so as to send said environment data thereto.

5. The drill measuring system, as recited in claim 4, wherein said sensor unit further comprises a bonding element, wherein said sensor chip is a pressure sensor chip, wherein said bonding element is connected to said pressure sensor chip and sealed by said sealing layer, wherein said sealing layer is sealed at said non-sensing area of said pressure sensor chip to expose said sensing area thereof to sense pressure data as said environment data when data logger travels at the borehole.

6. The drill measuring system, as recited in claim 5, wherein said pressure sensor further comprises a tube defining a sensing channel extended from said pressure sensor chip to sense said pressure data.

7. The drill measuring system, as recited in claim 6, wherein said sensor unit comprises a temperature sensor collecting temperature data as said environment data when said data logger travels at the borehole.

8. The drill measuring system, as recited in claim 7, further comprising an injector injecting said data logger into the borehole.

9. The drill measuring system, as recited in claim 2, wherein said sensor unit further comprises a bonding element, wherein said sensor chip is a pressure sensor chip, wherein said bonding element is connected to said pressure sensor chip and sealed by said sealing layer, wherein said sealing layer is sealed at said non-sensing area of said pressure sensor chip to expose said sensing area thereof to sense pressure data as said environment data when data logger travels at the borehole.

10. The drill measuring system, as recited in claim 9, wherein said pressure sensor further comprises a tube defining a sensing channel extended from said pressure sensor chip to sense said pressure data.

11. The drill measuring system, as recited in claim 1, wherein said data logger further comprises a photo detector serving as a switch that detects optical signal sent from said initiator to activate and switch on said data logger, wherein said initiator comprises an optical signal transmitter transmitting said optical signal as a switch signal to said data logger.

12. The drill measuring system, as recited in claim 1, wherein said communication unit comprises two pads disposed at and overlapped on a surface of said jacketing and connected to said data acquisitor so as to send said environment data thereto.

13. The drill measuring system, as recited in claim 1, wherein said sensor unit further comprises a bonding element, wherein said sensor chip is a pressure sensor chip, wherein said bonding element is connected to said pressure sensor chip and sealed by said sealing layer, wherein said sealing layer is sealed at said non-sensing area of said pressure sensor chip to expose said sensing area thereof to sense pressure data as said environment data when data logger travels at the borehole.

14. The drill measuring system, as recited in claim 13, wherein said pressure sensor further comprises a tube defining a sensing channel extended from said pressure sensor chip to sense said pressure data.

15. The drill measuring system, as recited in claim 13, wherein said sensor unit comprises a temperature sensor collecting temperature data as said environment data when said data logger travels at the borehole.

16. The drill measuring system, as recited in claim 15, further comprising an injector injecting said data logger into the borehole.

17. The drill measuring system, as recited in claim 1, wherein said sensor unit comprises a temperature sensor collecting temperature data as said environment data when said data logger travels at the borehole.

18. The drill measuring system, as recited in claim 1, further comprising an injector injecting said data logger into the borehole.

* * * * *